J. P. SCHMITZ.
SEWER-TRAPS AND FLUSHING-GATES.

No. 195,175. Patented Sept. 11, 1877.

WITNESSES
Jacob Mueller
John Linden.

INVENTOR
John Peter Schmitz

J. P. SCHMITZ.
SEWER-TRAPS AND FLUSHING-GATES.
No. 195,175. Patented Sept. 11, 1877.
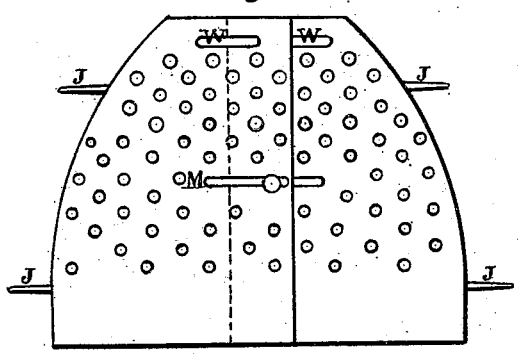
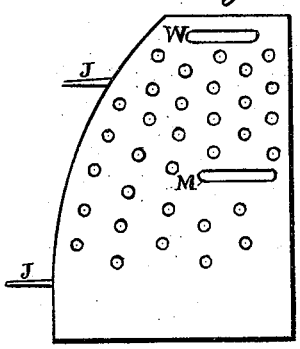
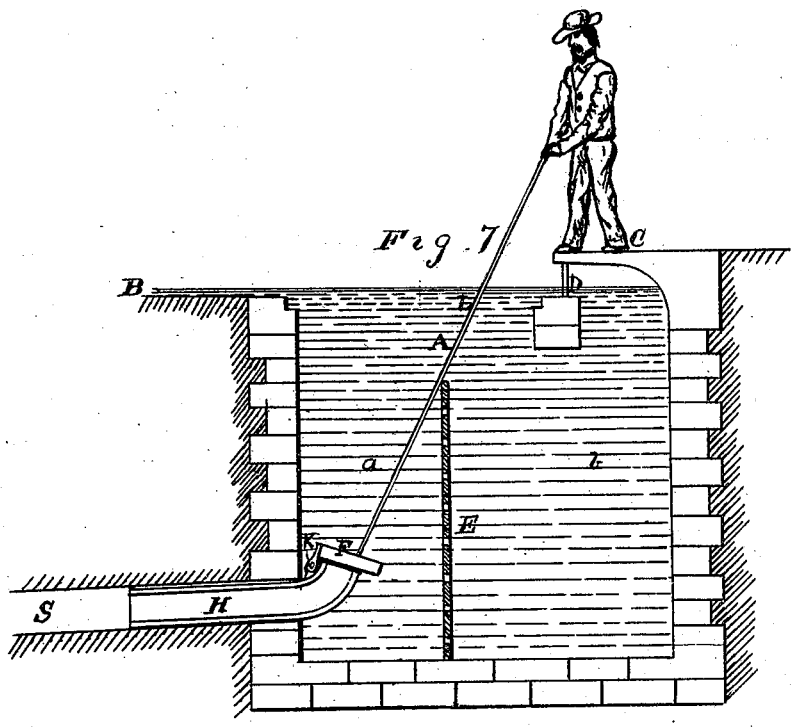
Witnesses
Jacob Mueller
John Linden
Inventor
John Peter Schmitz

UNITED STATES PATENT OFFICE.

JOHN PETER SCHMITZ, OF SAN FRANCISCO, CALIFORNIA.

IMPROVEMENT IN SEWER-TRAP AND FLUSHING-GATE.

Specification forming part of Letters Patent No. 195,175, dated September 11, 1877; application filed July 21, 1877.

*To all whom it may concern:*

Be it known that I, JOHN PETER SCHMITZ, of the city and county of San Francisco and State of California, have invented a new and Improved Sewer-Trap and Flushing-Gate; and I do hereby declare that the following is a full, clear, and exact description of the same.

This invention is an improvement in a trap and flushing-gate for sewers; and relates to a tube designed to be constructed of such size as to adapt it for insertion in the mouth of a sewer or sewer-pipe. Said tube is made in two equal parts, having elongated flanges by which they are screwed or bolted together, and thus forming a short bent tube. The elongated flanges keep the tube in its proper position when in the sewer. Said tube is provided with a hollow floating cover for regulating the escape of liquid from the cess-pool into the sewer, and may be easily applied to and detached from the sewer-pipe, as necessity requires.

The invention also relates to a two-part adjustable perforated partition for the cess-pool, as hereinafter described.

Figure 1:
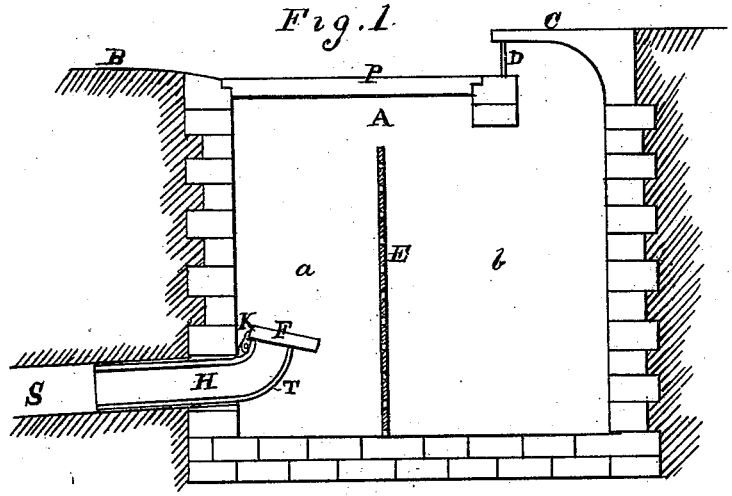
Figure 2:
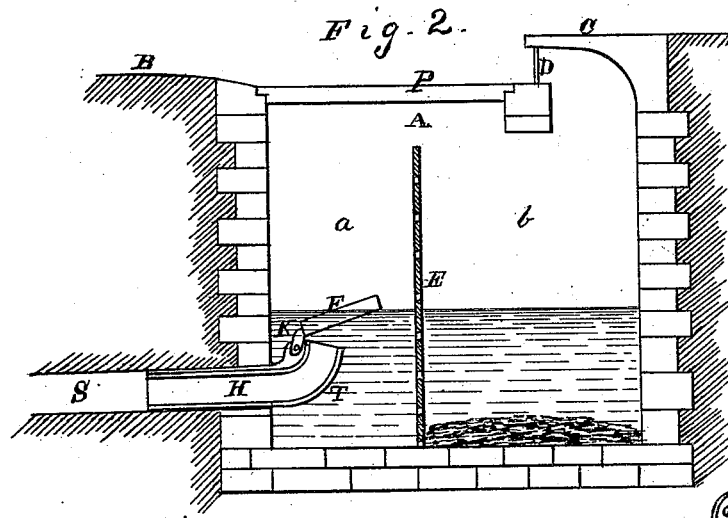
Figure 3:
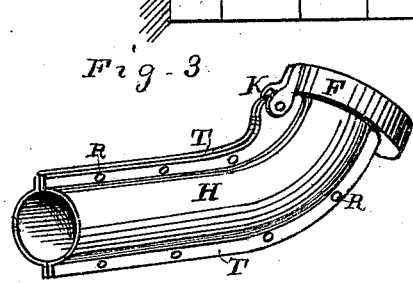
Figure 4:
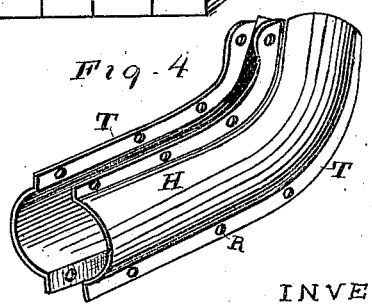

Figure 1 is a vertical section of a cess-pool, showing my improved trap and flushing-gate connected with the sewer, the opening of the tube being closed by the hollow floating cover. Fig. 2 is a similar view, showing the hollow floating cover raised and the trap opened by accumulation of water in the cess-pool. Figs. 3 and 4 are detailed views of the flanged tube and its hollow floating-cover attachment. Fig. 5 shows the perforated partition. Fig. 6 shows one-half part of the perforated partition. Fig. 7 shows the operation of flushing a sewer.

A indicates the cess-pool; B, the line of the street-pavement; C, the sidewalk; D, the grating placed in the mouth of the cess-pool, and P the cover of the latter.

The cess-pool is divided into two compartments, *a* and *b*, by an overlapping perforated partition, E, which is formed of two parts, each having projecting pins J, which fit into holes in the side walls of the cess-pool, thereby being kept standing upright in the cess-pool.

The two parts of the partition E are secured together adjustably by a bolt passing through the openings M, so that the partition may be readily set up in or removed from the cess-pool.

The openings W are intended as hand-holes for handling the partition when being placed in or removed from the cess-pool.

The sewer-pipe S is connected with compartment *a*, and the trap and flushing-gate is applied to its mouth, as shown.

The trap consists of a short bent tube, H, having exterior elongated flanges T, by which the two half-parts forming the tube are bolted together with bolts R, Figs. 3 and 4.

F is a hollow floating cover, attached to an arm or lug, K, which is formed in one piece with the flanges.

The operation of my trap and flushing-gate is as follows: The drainage-water from the street will flow into compartment *b* of the cess-pool, and the dirt, rubbish, or other hard substances which may be carried along with the water into the cess-pool will remain at the bottom of said compartment, as shown in Fig. 2, while the water and the dissolved matter will pass through the holes in the perforated partition E into the compartment *a*. When the water has risen in the cess-pool to such a height as to reach and bury the hollow floating cover F, Fig. 2, the trap is opened to allow the water to escape into the sewer-pipe S. When the water has escaped the hollow floating cover will again close the trap.

The operation of flushing the sewer will be as follows: The cover P on the cess-pool is removed, Fig. 7, and, with a stick or rod, L, being of sufficient length to reach from above the sidewalk down to the hollow floating cover F in the cess-pool, is held by the operator on to the cover F, as shown in Fig. 7, so as to prevent the cover from floating when the water has been turned on to fill the cess-pool. After the cess-pool has filled with water the stick or rod L is removed by the operator, when the hollow floating cover F suddenly rises, and the water will rush into the sewer with great force and thoroughly flush it.

What I claim is—

1. The bent tube H, having exterior flanges T, arm or lug K, and the hollow floating cover F attached thereto, in combination with the sewer-pipe and cess-pool, as shown and described.

2. The hollow floating cover F, attached to arm or lug K, in combination with the bent tube H, sewer-pipe, and cess-pool, as shown and described.

3. The perforated partition made of two like parts, overlapping each other vertically, and secured together adjustably by bolts passing through slots, and provided with the laterally-projecting pins, as shown and described, for the purpose specified.

JOHN PETER SCHMITZ.

Witnesses:
JACOB MUELLER,
JOHN LINDEN.